United States Patent [19]

Moradi-Araghi et al.

[11] Patent Number: 4,586,568

[45] Date of Patent: May 6, 1986

[54] POLYMERFLOOD PROCESS

[75] Inventors: Ahmad Moradi-Araghi; James E. Shaw, both of Bartlesville, Okla.

[73] Assignee: Phillips Petroleum Company, Bartlesville, Okla.

[21] Appl. No.: 770,456

[22] Filed: Aug. 29, 1985

[51] Int. Cl.[4] ............................................. E21B 43/22
[52] U.S. Cl. .................................... 166/273; 166/274; 166/275; 252/8.55 D
[58] Field of Search ....................... 166/273, 274, 275; 252/8.55 D, 8.55 R

[56] References Cited

U.S. PATENT DOCUMENTS 3,850,244  11/1974  Rhudy et al. ..................... 166/273

Primary Examiner—Stephen J. Novosad
Assistant Examiner—Thomas J. Odar
Attorney, Agent, or Firm—A. W. Umphlett

[57] ABSTRACT

A polymerflood oil recovery process comprising the use of low molecular weight polymers of alpha,beta-unsaturated mono- and dicarboxylic acids and alkali metal salts thereof in aqueous polymer slugs to stabilize the solution viscosity of said slugs throughout a polymerflooding process in which adverse subterranean conditions are encountered, such as high temperature, high salinity and/or high concentrations of "hardness" ions.

16 Claims, No Drawings

POLYMERFLOOD PROCESS

This invention relates to the recovery of petroleum from subterranean petroleum-bearing deposits. In another aspect, this invention relates to a polymerflood process carried out in an underground hostile environment with thickened aqueous solutions containing solution viscosity stabilizers. In accordance with another aspect, this invention relates to the injection of thickened aqueous solutions containing solution viscosity stabilizers such as low molecular weight polymers of alpha,beta-unsaturated carboxylic acids and salts thereof. Such stabilizer thickened aqueous fluids are useful in polymerflooding oil bearing formations wherein high temperatures and/or high salinity water and/or high hardness formation waters are encountered. In accordance with another aspect, this invention relates to polymerflood processes comprising the use of hostile environment polymeric viscosifiers such as N-vinyl-2-pyrrolidone/acrylamide (50/50 wt/wt) copolymer in combination with solution viscosity stabilizers such as low molecular weight polymers of alpha-beta unsaturated carboxylic acids and salts thereof, e.g., low molecular weight polyacrylic acids or sodium polyacrylates.

BACKGROUND

Many synthetic polymers have been developed and used in processes for the recovery of natural resources. Generally, a desirable property is that such polymers impart to a liquid an increased viscosity when a relatively small quantity of the polymer is added, and preferably at a minimal cost. There is an increasing demand for such thickened fluids which will retain solution viscosity even in hostile environments including, for example, high temperatures, high salinity and high concentrations of multivalent metal cations, commonly known as "hardness ions". Various types of water soluble polymers which can be used to prepare such thickened fluids are referred to as Hostile Environment (HE) polymers.

Oil accumulated within a subterranean oil-bearing formation is recovered or produced therefrom through wells, called production wells, drilled into the subterranean formation. A large amount of such oil is left in subterranean formations if produced only by primary depletion, i.e., where only formation energy is used to recover the oil. Where the initial formation energy is inadequate or has become depleted, supplemental operations often referred to as secondary and tertiary or enhanced or post-primary recovery operations are employed. The term "enhanced" will be used herein to refer to all such operations. Although conventional waterflooding is effective in obtaining additional oil from oil bearing subterranean formations, the technique does exhibit a number of shortcomings. Foremost among these shortcomings is the tendency of flooding water to "finger" through an oil-bearing formation thereby bypassing substantial portions of the oil bearing formation.

In order to restrict the mobility of the flooding water to no greater than the mobility of the oil, mobility control agents have been added to increase the viscosity of the water. Suitable agents for increasing the viscosity of the flooding water are water-soluble or water-dispersible high molecular weight polymers. These polymers are susceptible to adverse effects present in some subterranean formations, such as high temperature and dissolved electrolytes, which cause the polymers to precipitate and/or to lose their viscosifying capacity. The present polymerflooding process comprises the use of thickened fluids containing solution viscosity stabilizers. The use of such solution viscosity stabilizers is particularly advantageous during polymerflood processes in subterranean formations in which the injected thickened fluids are exposed to a hostile environment.

Accordingly, an object of this invention is to provide an improved polymerflood process.

Another object of this invention is to provide thickened fluids which exhibit good retention of solution viscosity during polymerflooding operations.

Another object of this invention is to provide a polymerflood system, including a solution viscosity stabilizer, effective in hostile environments in subterranean formations.

Other objects, aspects, as well as the several advantages of the invention will be apparent to those skilled in the art upon reading the specification and the appended claims.

SUMMARY OF THE INVENTION

In accordance with the invention, low molecular weight polymers of alpha,beta-unsaturated mono- and dicarboxylic acids are used to suppress the loss of solution viscosity in thickened fluids used during polymerflood processes in which adverse subterranean conditions are encountered, such as high temperatures, high salinity and/or high concentrations of "hardness" ions.

More specifically, in accordance with the invention, a solution viscosity stabilizing amount of at least one low molecular weight polymer of alpha,beta-unsaturated mono- and dicarboxylic acids and salts thereof is present in thickened aqueous fluids containing high molecular weight water-soluble polymeric viscosifiers during polymerflooding of subterranean formations, particularly those exposed to hostile conditions such as high temperatures, high salinity and/or high concentrations of "hardness ions".

In a specific embodiment of the invention, in a polymerflood process involving the use of high molecular weight polymeric viscosifiers bearing pendant hydrolyzable amide groups frequently found to be ineffective in hard brines at elevated temperatures because of hydrolysis and/or for precipitation, the improvement comprises the use of thickened aqueous fluids containing solution viscosity stabilizers such as low molecular weight polymers of alpha,beta-unsaturated mono- and dicarboxylic acids and salts thereof having molecular weights ranging from about 150 to about 2,000 to suppress the loss of solution viscosity, thereby stabilizing the solution viscosifying capacity of the high molecular weight polymeric viscosifier, particularly under hostile environment conditions, such as temperatures above about 170° F. and the presence of greater than 500 ppm "hardness cations".

DETAILED DESCRIPTION OF THE INVENTION

Viscosity Stabilizers

As disclosed hereinbefore, the present invention comprises the use of low molecular weight polymers of alpha,beta-unsaturated mono- and dicarboxylic acids to stabilize polymer solution viscosity of polymeric viscosifiers during a polymerflood process in a hostile environment. A hostile environment can be viewed as one in which conventionally used polymeric mobility control agents are not suitable.

Suitable low molecular weight polymers that can be used as viscosity stabilizers include polymers and alkali metal salts thereof having molecular weights of at least about 150 and up to about 2,000 preferably molecular weights in the range of about 300–1500. The low molecular polymer additives of the invention are formed from alpha,beta-unsaturated mono- and dicarboxylic acid monomers having a total of up to about 6 carbon atoms per molecule.

Representative alpha-beta-unsaturated carboxylic acids that can be used as monomers include acrylic acid, methacrylic acid, alpha-ethylacrylic acid, maleic acid (or maleic anhydride), fumaric acid, methylmaleic acid (citraconic acid), dimethylmaleic acid, crotonic acid, methylcrotonic acid, and the like, and mixtures thereof.

The alkali metal salt form of the low molecular weight polymers can also be used as solution viscosity stabilizers. The alkali metal salt form of the low molecular weight polymers can be formed by neutralization of the carboxylic acid form with an alkali metal hydroxide, such as aqueous sodium hydroxide, to yield the coresponding salt. Suitable counter ions include any of the alkali metal cations although sodium and potassium are preferred. Specific examples include sodium polyacrylate and sodium polymaleate.

The amount of low molecular weight polymer viscosity stabilizer required during a polymerflood process can vary appreciably depending upon the particular polymer and the conditions of the hostile environment as well as the particular stabilizer. Broadly, the amount of stabilizer present will provide a sufficient concentration of the low molecular weight polymer or salt thereof to suppress the loss of solution viscosity. This loss of solution viscosity is facilitated at elevated temperatures and at pH levels greater than 7. In general, suitable amounts of stabilizer range from about 0.1 to about 20 weight percent and higher, if necessary, preferably about 0.5 to about 10 weight percent of the aqueous polymer solution, more preferably about 1 to about 3 weight percent.

Polymeric Viscosifiers

As used herein the term "polymers" in regard to high molecular weight polymeric viscosifiers is used generically unless otherwise indicated to mean homopolymers, copolymers, and terpolymers and thus includes polymers prepared using any number of monomers.

The homopolymers and copolymers that can be used according to the invention are well suited for polymerflooding. The polymers that can be used in combination with solution viscosity stabilizers according to the invention are useful because such solutions exhibit significant solution viscosities even under hostile environment conditions. A hostile environment for the purpose of this application is one in which the temperature, salinity and/or hardness cation content is sufficient to cause polymer precipitation, loss of solution viscosity and/or similar adverse effects within a nominal period of time.

A hostile environment can best be viewed as one in which conventionally used thickening agents are not suitable. Polyacrylamides are such conventionally used thickening agents. A hostile environment, for example, is one wherein the reservoir temperature can be as low as 170° F. and electrolyte concentration of dissolved salts in the available water, both injection water (which may be sea water) and formation water is at least about 35,000 ppm (with about 1,750 ppm combined calcium and magnesium ion), i.e., about 3.5 weight percent or higher, which is equivalent to a salinity of about 35 grams of dissolved salts per kilogram of solution. At lower reservoir temperatures, e.g., from about 120° F. to about 170° F., a relatively higher salinity and/or content of hardness cations would create such a hostile environment, for example, a salinity of at least about 50–100 grams of dissolved salts per kilogram of solution with a ratio of divalent hardness cations to total cations of at least about 1 to 5.

The inventive process is applicable to polymeric viscosifiers containing 10 to 90 weight percent monomeric units bearing pendant hydrolyzable amide groups, preferably 30 to 70 weight percent amide monomer moieties and most preierably 40 to 60 weight percent of amide bearing monomer units. Suitable polymers may contain one or more monomer units in addition to the amide bearing monomer unit.

As indicated hereinbefore, high molecular weight polymeric viscosifiers bearing pendant hydrolyzable amide groups have been found to be ineffective in hard brines at elevated temperatures because of amide hydrolysis and precipitation of the polymeric viscosifiers. Representative polymeric viscosifiers that can be used according to the invention include homopolymers of alpha,beta-unsaturated amides and copolymers thereof with N-vinyl lactams and/or vinyl-containing sulfonate comonomers.

Suitable alpha,beta-unsaturated amide monomers include those having the formula

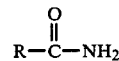

wherein R is an 1-alkenyl radical selected from ethenyl (vinyl), propenyl, isopropenyl, 1-butenyl, 2-methyl-1-propenyl, 1-pentenyl, 3-methyl-1-butenyl, and 1-methyl-1-butenyl. These alpha,beta-unsaturated amide monomers are generally water-soluble or water-dispersible.

A more preferred class of alpha,beta-unsaturated amide monomers are those of the formula

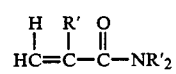

wherein each R' is individually selected from H and methyl. Especially suitable in addition to acrylamide are N-methylacrylamide and N,N-dimethylacrylamide (DMAm).

Suitable comonomers that can be polymerized with alpha,beta-unsaturated amides include N-vinyl lactams having the formula

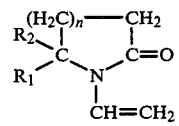

wherein $R_2$ and $R_1$ are selected independently from the group consisting of hydrogen, methyl and ethyl and n is an integer of from 1 to 3. These monomers are generally water-soluble or water-dispersible. A more preferred class of compounds are those of the formula

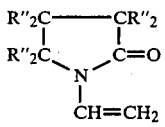

wherein R" is hydrogen, methyl or ethyl. The monomer unit presently most preferred is N-vinyl-2-pyrrolidone (VP).

The monomers presently preferred are N-vinyl-2-pyrrolidone (VP) and acrylamide (Am). For convenience, the terms VP and Am will be used to refer to the first and second monomers, respectively, in the discussion herein.

For both the N-vinyl lactam and alpha,beta-unsaturated amide, the scope can be viewed functionally as including the replacement o: hydrogens with hydrocarbon groups so long as the monomer remains hydrophilic. In this disclosure, the term hydrophilic monomers refers to monomers which yield water soluble homopolymers.

The monomer weight ratios used in the preparation of the copolymers can vary rather widely. Generally, VP:Am ratios in the range from about 10:90 to about 90:10 are employed depending upon the intended application but preferably VP:Am weight ratios in the range of about 25:75 to about 75:25 are employed, more preferably from about 30:70 to about 70:30. A copolymer presently preferred for certain applications under hostile environment conditions was prepared by copolymerizing 60 parts by weight of VP and 40 parts by weight of Am corresponding to a 1:1 molar ratio. The VP:Am weight ratios of 10:90 to 90:10 correspond to molar ratios of about 6:94 to 85:15. Numerical designations such as 60/40 VP/Am indicate the relative weights of monomers charged to the polymerization zone.

Other comonomers that can be used to form polymers suitable for this invention include ethylenically unsaturated monomers bearing sulfonate groups represented by the following formula

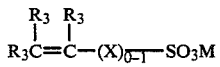

wherein $R_3$ is hydrogen, methyl, or ethyl, preferably methyl or hydrogen and provided further that at least one of the $R_3$ groups on the terminal carbon of the vinyl group is H and the other is H or methyl; M is H, Na+, K+, Li+, R'''$_4$N+, Ca++ or Mg++ and X is

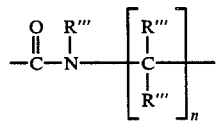

or

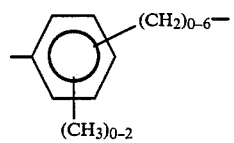

wherein n is an integer of 1–5 preferably 1–3 and R''' is H or an alkyl group containing 1–3 carbon atoms.

Examples of suitable comonomers containing sulfonate groups include:

vinyl sulfonate, sodium salt

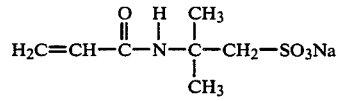

2-acrylamido-2-methylpropanesulfonate, sodium salt styrene sulfonate, sodium salt

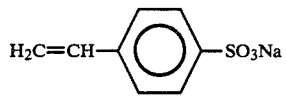

sodium vinyl toluene sulfonate

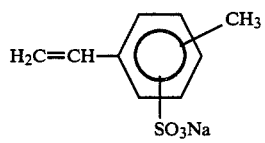

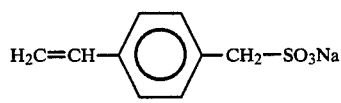

sodium p-vinylbenzyl sulfonate, and the like, and mixtures thereof.

These are known monomers and can be produced as is known in the art. Particularly, the N-sulfohydrocarbon-substituted acrylamides are disclosed in U.S. Pat. No. 3,679,000 assigned to the Lubrizol Corporation, the disclosure of which patent is incorporated by reference. The 2-acrylamido-2-methylpropanesulfonic acid is available from Lubrizol under the designation AMPS.

The polymers of this invention can be produced by solution, emulsion, inverse emulsion (water and oil) or slurry polymerization processes, all known in the art.

The polymers of this invention can be prepared by processes using various free radical polymerization initiators known to those skilled in the art. Preferred initiators include chemical polymerization initiators, the introduction of electromagnetic or nuclear radiation to generate free radicals and combinations of both techniques.

For enhanced oil recovery applications, the preferred copolymers of this invention comprise copolymers of N-vinyl-2-pyrrolidone (VP) and acrylamide (Am) in which the weight ratios of VP:Am preferably range from about 30:70 to about 70:30. The higher proportions of VP are preferred for reservoirs having more hostile conditions, e.g., higher temperature, salinity and/or hardness of the formation water.

ENHANCED OIL RECOVERY

Any suitable amount of the polymeric viscosifiers can be used in the embodiments of the invention concerning the recovery and processing of natural resources. For example, in the introduction of aqueous polymer slugs into a subterranean formation in processes for enhanced oil recovery, a small but effective amount of polymer should be used to produce the desired viscosity in the injection fluid. As a general guide, the amount of polymer used will be in the range of from about 500 ppm to about 10,000 ppm, preferably 1,000 ppm to about 3,000 ppm, based on the weight of the injection fluid.

Following injection of the thickened aqueous solution containing a low molecular weight polymer stabilizer into the subterranean formation normal post-primary operations can then be employed. For instance, a thickened aqueous solution can be injected followed by a drive fluid as is known in the art. A water drive following injection of a thickened aqueous slug will aid in driving oil within the formation toward a recovery well or wells where oil is produced. The inventive thickened aqueous solution containing a solution viscosity stabilizer can also be used as a mobility buffer in a surfactantflooding operation. For instance, a surfactant system can be injected and thereafter a mobility buffer, followed by a drive fluid as is known in the art. This mobility buffer helps to prevent fingering and enhances the sweep efficiency of the process.

Mobility buffer solutions are aqueous solutions of thickening agents. Examples of useful mobility buffers are aqueous fluids or aqueous saline fluids containing mobility reducing agents such as high molecular weight partially hydrolyzed polyacrylamides, biopolysaccharides, cellulose ethers and the like. The mobility buffer contains 50 to 20,000 preferably 200 to 5,000 ppm of the mobility reducing agent in the fluid.

The mobility buffer fluid can be injected at a constant composition or the mobility buffer can be graded, i.e., the injection starts with a relatively high concentration of mobility reducing agent at the leading edge and the concentration of said agent tapers off toward the trailing edge. As an example, the mobility buffer can start with a concentration of 2500 ppm of polyacrylamide in the water and end with 250 ppm of polyacrylamide in water. These mobility buffer fluids are well known in the art.

A suitable drive fluid can be injected into the formation subsequent to injection of the mobility buffer. The drive fluid can be fresh or salt water or other aqueous fluids compatible with an oil-bearing formation as known to those skilled in the art.

The following specific examples will serve to illustrate this invention but are not to be considered limiting.

EXAMPLE I

The addition of inexpensive, low molecular weight polyacrylic or polymaleic acids as sodium salts to partially hydrolyzed vinylpyrrolidone-acrylamide copolymer (VP:Am copolymer) significantly increased the viscosity of the polymer solution. Table I lists viscosities of partially hydrolyzed VP:Am copolymer in seawater with and without the presence of these materials. Addition of 5,000 ppm of polyacrylic or polymaleic acid (Na salts) resulted in solution viscosities which were 39 to 56% higher than solution viscosities in the absence of such additives. Compare runs 1 and 3, 2 and 3, 4 and 3, 5 and 6, and 8 and 9. The sodium salt of polyacrylic acid itself caused only a slight increase in the viscosity of seawater at 250° F. from 0.28 to 0.34 cp. (Run 7).

The cloud points of 5,000 ppm solutions (seawater) of polyacrylic acids (Na salts) with molecular weights of 2,000 and 5,000 were 202° F. and 140° F., respectively. These materials cannot be used in polymerfloods above these temperatures. In fact, when a solution of 1,000 ppm of the 2,000 or 5,000 molecular weight polyacrylic acid (Na salt) was injected into a Berea core at 250° F., the core plugged. The brine (3082 ppm Na, 182 ppm Ca, 78 ppm Mg) used contained even lower concentrations of sodium, calcium, and magnesium than seawater. When the core temperatures were brought below the cloud point values, the cores were no longer plugged. Polyacrylic acid (Na salt) of molecular weight 750 could be used in cores at 250° F. Injection of 14 pore volumes of a 200 ppm solution of this material caused no plugging or even a decrease in permeability. When this was followed with 200 ppm VP:Am polymer containing 200 ppm of the polyacrylate, there also was no plugging.

In summary, the polyacrylic and polymaleic acids as sodium salts cause significant increases in the viscosity of VP:Am copolymer solutions even in hard brines like seawater. Only molecular weights of less than 2,000 are suitable for use in high temperature reservoirs (250° F.).

TABLE I

| | Polymer Solution | | | | |
|---|---|---|---|---|---|
| Run | VP-Am Copolymer[a] | Polymeric Acid[b] | Molecular Weight of Polymeric Acid | pH | Viscosity at 250° F. (cp) |
| 1 | 2,500 ppm | 5,000 ppm | 750[c] | 8.5 | 1.26 |
| 2 | 2,500 ppm | 5,000 ppm | 750[c] | 7.0 | 1.22 |
| 3 | 2,500 ppm | 0 | — | 8.3 | 0.88 |
| 4 | 2,500 | 5,000 ppm | 2,000[c] | 7.9 | 1.27 |
| 5 | 2,500 ppm | 5,000 ppm | 5,000[c] | 8.3 | 1.39 |
| 6 | 2,500 ppm | 0 | — | 8.3 | 0.89 |
| 7 | 0 | 5,000 ppm | 5,000[c] | 8.3 | 0.34 |
| 8 | 2,500 ppm | 5,000 ppm | 500–1,000[d] | 6.9 | 1.22 |
| 9 | 2,500 ppm | 0 | — | 8.3 | 0.88 |

[a]The copolymer was made using 50% by weight acrylamide and 50% vinylpyrrolidone feedstock for the copolymerization. About 65% of the acrylamide units in the copolymer were hydrolyzed to carboxylates by aging in seawater for 1 week at 300° F. This was equivalent to several months at 250° F. Concentrations of copolymer were obtained by dilution of aged 2% copolymer in seawater with seawater.
[b]Sodium hydroxide added to neutralize polyacrylic acid and achieve recorded pH.
[c]Polyacrylic acid
[d]Polymaleic acid

EXAMPLE II

Additional data for other polymers such as polyacrylamide (Dow Pusher 700) and poly(sodium 2-acrylamido-2-methylpropanesulfonate) were obtained. A 2,500 ppm solution of Dow Pusher 700 (30% hydrolyzed) had its room temperature viscosity increased from 10.8 to 11.5 cP by addition of 5,000 ppm sodium polyacrylate (molecular weight 750). The difference is small for room temperature viscosities but at high temperatures the percentage difference would be much greater. The polyacrylic acid causes the best improvement in viscosities at higher temperatures. It was found that sodium polyacrylate did not stabilize the solution viscosity of a sodium 2-acrylamido-2-methylpropanesulfonate homopolymer. The sodium polyacrylate appears to stabilize solution viscosities for polymeric viscosifiers containing the carboxylate group.

EXAMPLE III

Additional data in Table II indicate that polyacrlic acids are better agents for viscosity enhancement of partially hydrolyzed polyacrylamides or VP-Am copolymers than poly(ethylene glycol) or ethylenediaminetetraacetic acid (EDTA). EDTA is noted for being a very good complexing agent for divalent Ca and Mg cations. All solutions were prepared with synthetic North Sea water.

TABLE II

| Run | VP-Am Polymer[a] | Agent Added for Viscosity Enhancement[b] | pH | Viscosity at 250° F. (cp) |
|---|---|---|---|---|
| 1 | 2,500 ppm | None | 8.3 | 0.89 |
| 2 | 2,500 ppm | 5,000 ppm polyacrylic acid (MW 5,000) | 8.3 | 1.39 |
| 3 | 2,500 ppm | 5,000 ppm poly(ethylene glycol) (MW 14,000) | 8.3 | 0.90 |
| 4 | 2,500 ppm | 5,000 ppm EDTA | 8.3 | 1.08 |

[a]The copolymer was made using 50% by weight acrylamide and 50% vinylpyrrolidone feedstock for the copolymerization. About 65% of the acrylamide units in the copolymer were hydrolyzed to carboxylates by aging in seawater for 1 week at 300° F. This was equivalent to several months at 250° F. Concentrations of copolymer were obtained by dilution of aged 2% copolymer in seawater with seawater.
[b]Sodium hydroxide added to neutralize polyacrylic acid and EDTA to achieve recorded pH.

What is claimed is:

1. In a polymerflood process for the recovery of oil from subterranean oil reservoirs pentrated by spaced injection and production wells comprising the sequential injection of thickened aqueous solution and aqueous drive wherein the polymeric viscosifier bears pendant hydrolyzable groups, the improvement is the inclusion of a solution viscosity stabilizing amount of at least one low molecular weight polymer having a molecular weight of about 150-2000 of at least one of alpha,beta-unsaturated mono- and dicarboxylic acids having a total of up to about 6 carbon atoms per molecule and alkali metal salts thereof in said thickened solution to stabilize the solution viscosity thereof.

2. A process according to claim 1 wherein said aqueous solution is thickened with a polymeric viscosifier containing about 10 to about 90 weight percent monomer units bearing pendant hydrolyzable groups.

3. A process according to claim 1 wherein said low molecular weight polymer is one of sodium polyacrylate and sodium polymaleate.

4. A process according to claim 1 wherein the viscosity stabilizing low molecular weight polymer comprises about 0.1 to about 20 weight percent of the thickened aqueous solution introduced into the reservoir.

5. A process according to claim 1 wherein said aqueous solution is thickened with a partially hydrolyzed polyacrylamide or a copolymer of N-vinyl-2-pyrrolidone and acrylamide.

6. A process according to claim 5 wherein the low molecular weight polymer is sodium polyacrylate or sodium polymaleate.

7. A process for improving the enhanced recovery of oil from subterranean oil reservoirs penetrated by at least one injection well and at least one production well by means of polymerflooding in which aqueous slug of polymeric viscosifier is exposed to a hostile environment which comprises introducing into a reservoir through an injection well an aqueous solution containing polymeric viscosifier bearing pendant hydrolyzable groups and a solution viscosity stabilizing amount of about least one low molecular weight polymer having a molecular weight of about 150-2,000 of at least one of alpha,beta-unsaturated mono- dicarboxylic acids having a total of up to about 6 carbon atoms per molecule and alkali metal salts thereof to stabilize the solution viscosity of the polymeric viscosifier slug under hostile enviroment conditons.

8. A process according to claim 7 wherein said low molecular weight polymer is one of sodium polyacrylate and sodium polymaleate.

9. A process according to claim 7 wherein the amount of low molecular weight polymer ranges from about 0.5 to about 10 weight percent of the aqueous solution.

10. A process according to claim 7 wherein said polymeric viscosifier is partially hydrolyzed polyacrylamide or a copolymer of N-vinyl-2-pyrrolidone and acrylamide and the amount of low molecular weight polymer viscosity stabilizer ranges from about 0.5 to about 10 weight percent of the aqueous solution.

11. A process according to claim 10 wherein said low molecular weight polymer is sodium polyacrylate or sodium polymaleate.

12. A process according to claim 11 wherein the amount of polyacrylate or polymaleate ranges from about 1 to about 3 weight percent of the aqueous solution.

13. A process according to claim 7 wherein said polymeric viscosifier is a terpolymer containing monomer bearing sulfonate group.

14. A process according to claim 13 wherein said monomer bearing sulfonate group is sodium 2-acrylamido-2-methylpropanesulfonate.

15. A process according to claim 7 wherein a surfactant system is injected into the formation after polymerflooding and which is followed by a mobility buffer and drive fluid, to produce additional oil from the formation through producing wells.

16. A process according to claim 15 wherein said mobility buffer comprises a solution of a polymer bearing pendant amide or carboxylate groups and solution viscosity stabilizing low molecular weight polymer.

* * * * *